Figure 1:
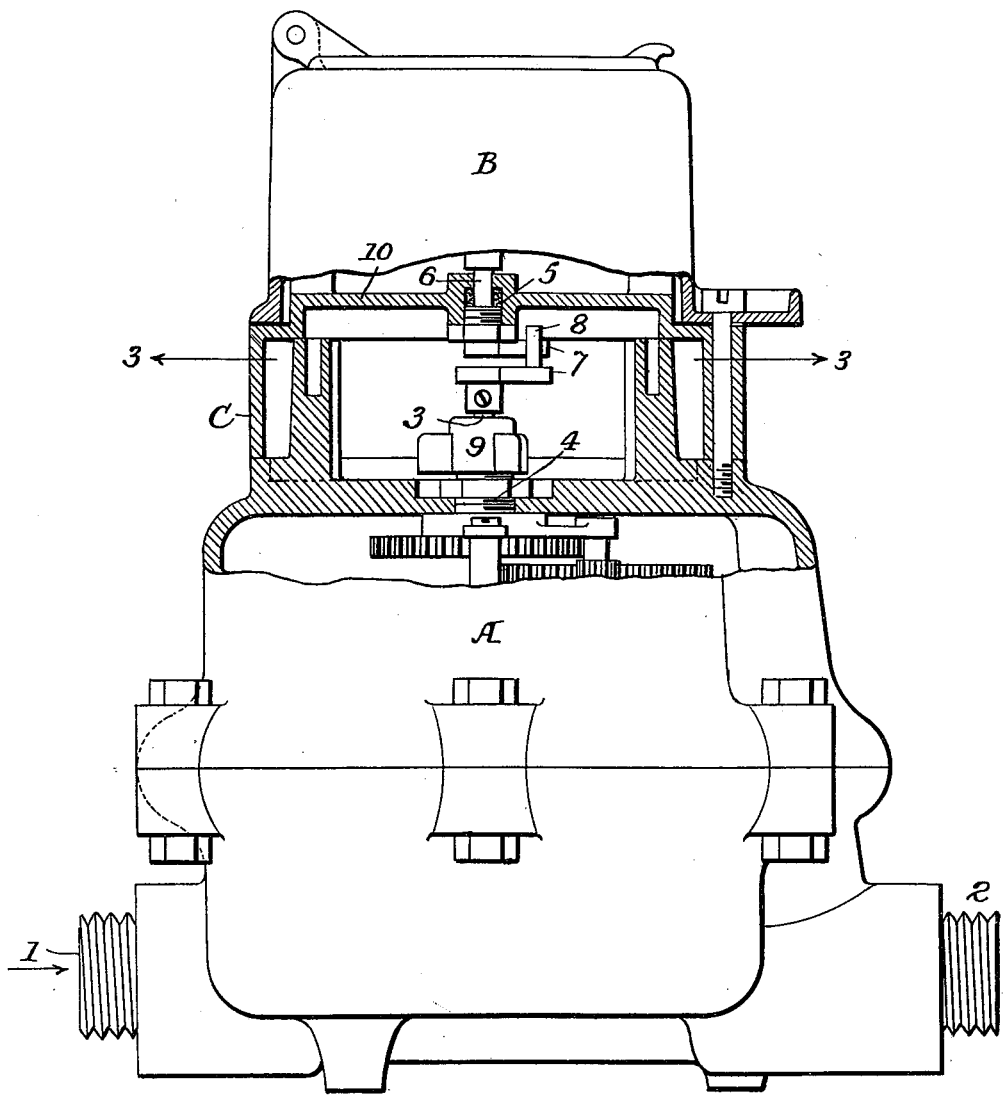

No. 675,145. Patented May 28, 1901.
J. A. TILDEN.
WATER METER.
(Application filed Oct. 9, 1900.)
(No Model.) 3 Sheets—Sheet 1.

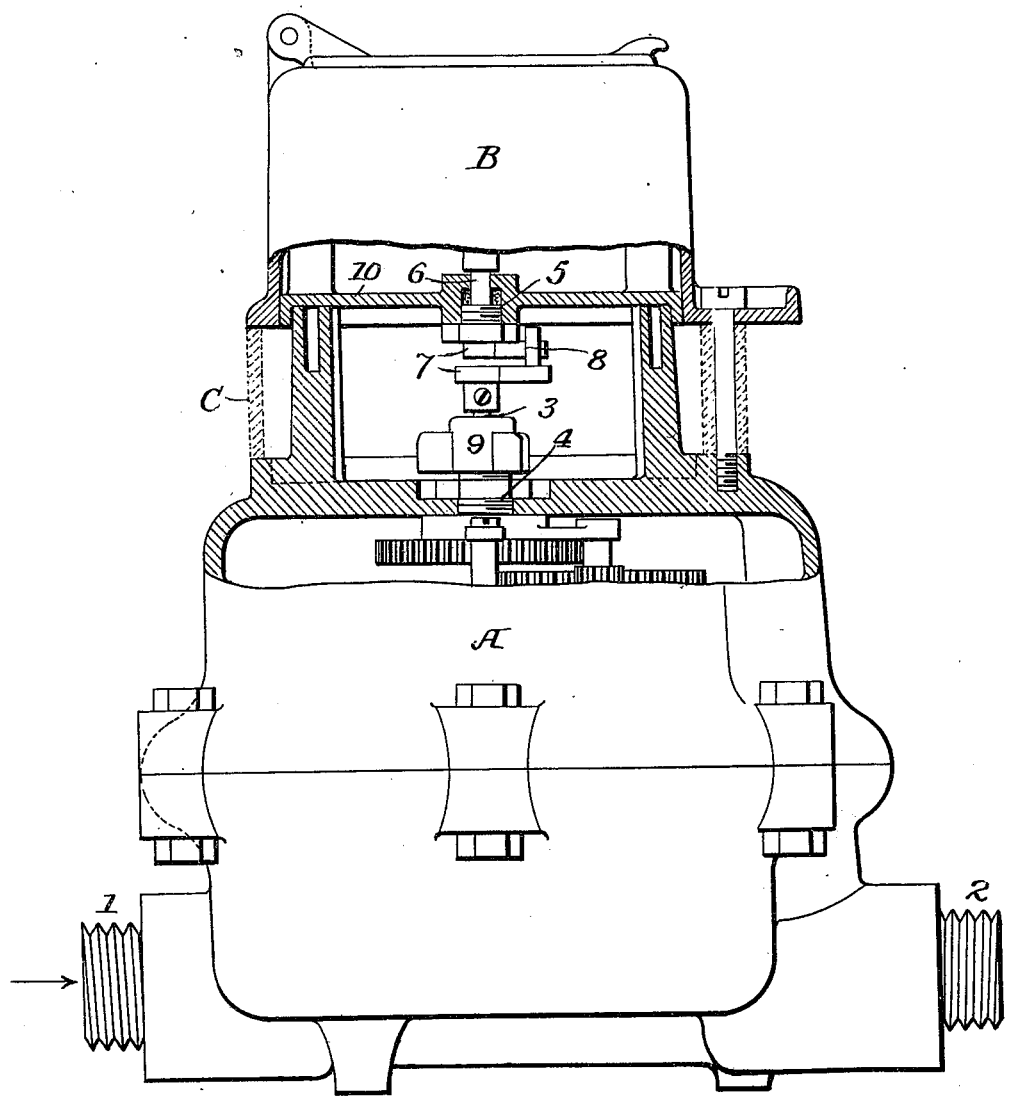

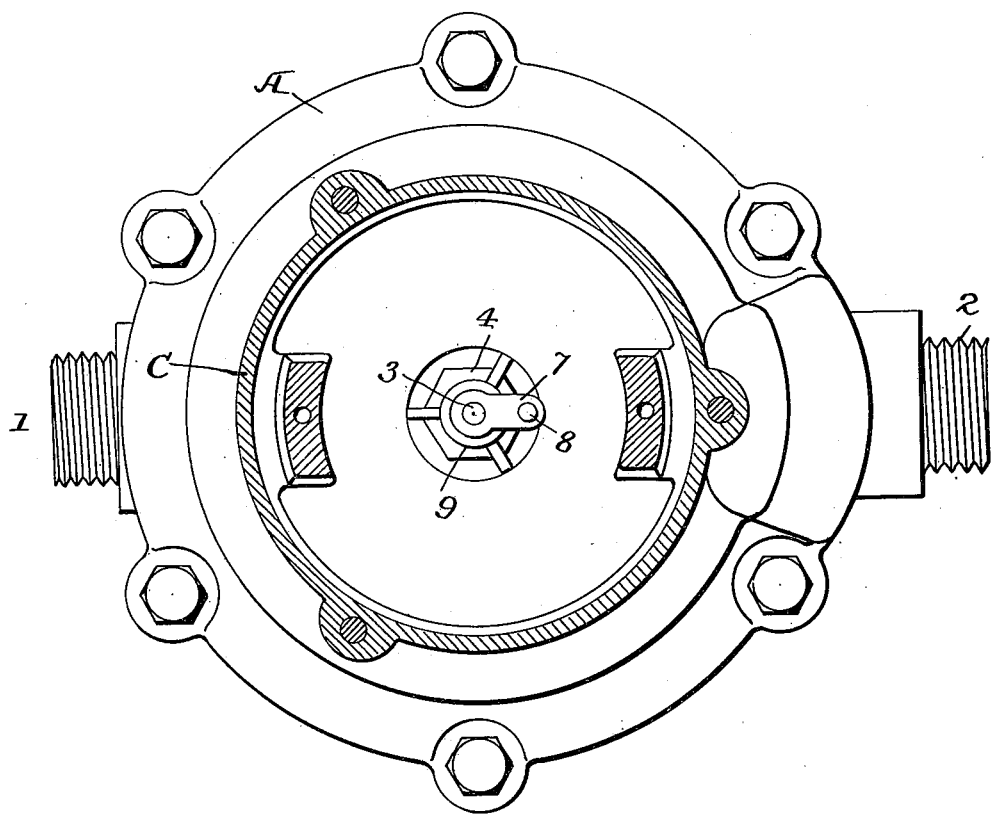

UNITED STATES PATENT OFFICE.

JAMES A. TILDEN, OF HYDE PARK, MASSACHUSETTS.

WATER-METER.

SPECIFICATION forming part of Letters Patent No. 675,145, dated May 28, 1901.

Application filed October 9, 1900. Serial No. 32,528. (No model.)

*To all whom it may concern:*

Be it known that I, JAMES A. TILDEN, a citizen of the United States, residing at Hyde Park, in the county of Norfolk and State of Massachusetts, have invented certain new and useful Improvements in Water-Meters, of which the following is a specification.

My invention relates to water-meters, and especially to that class in which there is a casing containing the registering mechanism arranged to be operated from a spindle actuated by the meter mechanism; and my invention consists in providing two independent sealed casings for the meter and register devices and in constructing and connecting the same, as fully set forth hereinafter and as illustrated in the accompanying drawings, in which—

Figure 1 is a side view of a meter embodying my improvements, the connecting-support between the meter and register casings in section. Fig. 2 is a view illustrating the two casings of an ordinary meter detached from each other, with the intermediate support in dotted lines; Fig. 3, a sectional view on the line 3 3, Fig. 1.

The meter, which may be of any usual or desired form or construction, has a casing A, with inlet 1 and outlet 2, adapted for connection in the line of supply-pipe, and the spindle 3, which is to actuate the registering mechanism, extends through a packing-box 4 at the top of the casing. Usually the registering mechanism is arranged within a casing formed by a cap bolted to the casing A, the top of which thus forms the bottom of the register-chamber, the spindle 3 being connected with the gears of said mechanism to operate the same. This has the disadvantage, even if the meter-casing is carefully sealed, so that there can be no flow therefrom to the register-casing. There is yet opportunity for water from outside sources to find its way to the registering-casing and its mechanism and for the latter to become clogged and its operations impaired or prevented by particles jamming in the gears. Further difficulties arise from the effort to properly pack and connect a spindle passing from one casing to another. To avoid these results, I use two casings, both sealed, one, A, for the meter mechanism and one, B, for the registering mechanism, the latter, suitably supported above the meter-casing, provided with a packing-box 5, through which I extend a spindle 6, connected to turn the registering-train, and I suitably connect the spindles 3 and 6, so that the latter is driven by the former. Preferably I provide a flexible connection between the two spindles, whereby to permit free motion without undue friction if the spindles should not be absolutely in line or on parallel lines. Thus each spindle has an arm 7, and a pin 8 of one arm bears on the other arm, as shown, so that one is driven by the other.

If the spindle extended continuously from one casing into the other, it would be necessary to construct the meter and register specially for joint operation; but by using independent spindles extending from the two casings and connected flexibly together it is practicable to adopt the register-casing and its parts for attachment to meters already in use.

Any suitable means may be used for supporting the sealed register-casing above the sealed meter-casing. Preferably the intermediate space is closed, as by a support C in the form of a cap, the top of which forms the bottom of the register-casing, as in Fig. 1, or the register-casing may have an independent bottom piece 10, and the support C may be a ring, as in Fig. 2. In either case the intermediate chamber should not be sealed tightly, as water cannot pass to the casings, but should be open to external conditions. In either case, also, the invention may be used in connection with meters of ordinary construction by adapting the support C to fit the meter and register casings after elevating the latter from its usual position on the meter-casing to a position permitting the proper connection of the spindles, as shown in Fig. 3. As each spindle is packed, there is slight chance of leakage around either; but should the pressure in the meter-casing cause leakage the escaping liquid can flow away between the casings without affecting the registering mechanism, and if water should from any cause collect between the two casings it is excluded from the registering-train by the sealed casing B. The support C thus applied is adapted for attachment to the meter-casing at the same points and in the same manner as the register-casing and has at the top the same bearings for the register-casing as the top of the meter-casing. With such an intermediate support it is practicable to apply the sealed register-casing to the sealed meter-casing and support it thereon, so as to seal each casing independently of the other, it being necessary only to provide in addition a flexible connection between the spindles of the two casings.

Without limiting myself to the precise construction shown, I claim—

1. The combination of the sealed meter-casing, a sealed register-casing supported above the meter-casing, with a space between open to external conditions, independent spindles extending from said casings through packing-boxes thereof, and means for flexibly connecting said spindles to permit one to rotate without necessary alinement with the other, substantially as set forth.

2. The combination of the meter-casing, of a support in the form of a flanged cap C, and a register-casing of which the cap constitutes the bottom, substantially as set forth.

In testimony whereof I have signed my name to this specification in the presence of two subscribing witnesses.

JAMES A. TILDEN.

Witnesses:
  HENRY D. WINTON,
  WM. J. SMITH.